(12) United States Patent
Baudot

(10) Patent No.: US 10,451,802 B2
(45) Date of Patent: Oct. 22, 2019

(54) JUNCTION REGION BETWEEN TWO WAVEGUIDES AND ASSOCIATED METHOD OF PRODUCTION

(71) Applicant: STMicroelectronics (Crolles 2) SAS, Crolles (FR)

(72) Inventor: Charles Baudot, Lumbin (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 0 days.

(21) Appl. No.: 16/374,214

(22) Filed: Apr. 3, 2019

(65) Prior Publication Data

US 2019/0235166 A1   Aug. 1, 2019

Related U.S. Application Data

(62) Division of application No. 15/367,901, filed on Dec. 2, 2016, now Pat. No. 10,288,806.

(30) Foreign Application Priority Data

Jun. 30, 2016 (FR) ...................... 16 56188

(51) Int. Cl.
*G02B 6/125* (2006.01)
*G02B 6/122* (2006.01)
*G02B 6/136* (2006.01)
*G02B 6/12* (2006.01)

(52) U.S. Cl.
CPC ........... *G02B 6/125* (2013.01); *G02B 6/1228* (2013.01); *G02B 6/136* (2013.01); *G02B 2006/121* (2013.01); *G02B 2006/12061* (2013.01); *G02B 2006/12097* (2013.01); *G02B 2006/12173* (2013.01); *G02B 2006/12176* (2013.01)

(58) Field of Classification Search
CPC ...... G02B 6/125; G02B 6/136; G02B 6/1228; G02B 2006/12061; G02B 2006/12173; G02B 2006/121; G02B 2006/12176; G02B 2006/12097
See application file for complete search history.

(56) References Cited

U.S. PATENT DOCUMENTS

| | | | |
|---|---|---|---|
| 8,041,164 B2* | 10/2011 | Granestrand | B82Y 20/00 29/600 |
| 2004/0131310 A1 | 7/2004 | Walker | |
| 2005/0213912 A1 | 9/2005 | Aalto | |
| 2010/0322560 A1 | 12/2010 | Granestrand et al. | |
| 2018/0017732 A1* | 1/2018 | Tassaert | G02B 6/12002 |
| 2018/0059329 A1* | 3/2018 | Boutami | G02B 6/1228 |
| 2018/0188453 A1* | 7/2018 | Chetrit | G02B 6/12002 |
| 2018/0231714 A1* | 8/2018 | Collins | G02B 6/12002 |

OTHER PUBLICATIONS

INPI Search Report and Written Opinion for FR 1656188 dated Mar. 21, 2017 (8 pages).

* cited by examiner

Primary Examiner — John Bedtelyon
(74) Attorney, Agent, or Firm — Crowe & Dunlevy

(57) ABSTRACT

A photonic integrated device includes a first waveguide and a second waveguide. The first and second waveguides are mutually coupled at a junction region which includes a bulge region. The bulge region is defined two successive etching operations using two distinct etch masks, where the first etching operation is a partial etch and the second etching operation is a complete etch.

7 Claims, 3 Drawing Sheets

JUNCTION REGION BETWEEN TWO WAVEGUIDES AND ASSOCIATED METHOD OF PRODUCTION

CROSS-REFERENCE TO RELATED APPLICATIONS

This application is a divisional of U.S. patent application Ser. No. 15/367,901 filed Dec. 2, 2016, which claims priority from French Application for Patent No. 1656188 filed Jun. 30, 2016, the disclosures of which are incorporated by reference.

TECHNICAL FIELD

Modes of implementation and embodiments of the invention relate to photonic integrated circuits, in particular photonic integrated circuits comprising different waveguides, and most especially the means for coupling these different waveguides to one another.

BACKGROUND

Conventionally, in a junction area between two waveguides, for example between a rib waveguide and a strip waveguide, the slab of the rib waveguide is gradually reduced until it is the same width as the rib of the strip waveguide.

As illustrated in FIGS. 1 and 2, this type of junction may conventionally be produced via a first operation of partially etching a silicon film 1, which etching operation is achieved using a first mask M1 (FIG. 1) and allows a first region 2, delimiting the slab and the rib of the rib waveguide, and in particular the portion of the slab of the first waveguide whose width gradually decreases, to be etched.

A second etching operation, achieved using a second mask M2 (FIG. 2), allows the strip waveguide to be delimited and a region 3 of the insulating layer located on either side of the two waveguides to be completely etched.

However, while carrying out the two etching operations, it is possible for alignment errors to occur between the two masks, for example an offset along the transverse axis X that may potentially exceed 30 nanometers.

For strip waveguides of conventional widths, for example, of a few hundred nanometers, these offsets lead to discontinuities, or walls, at the junction between the two waveguides, causing substantial attenuations of the optical signal or parasitic reflections.

SUMMARY

Thus, according to one embodiment, a junction region between two waveguides exhibiting discontinuities that are much reduced, or even non-existent, and whose method of production is robust to alignment errors, is proposed.

According to one aspect, a photonic integrated device is proposed comprising a semiconductor substrate comprising a first lateral area, a second lateral area, a central area, a first intermediate area that is located between the first lateral area and the central area, a second intermediate area that is located between the second lateral area and the central area.

The substrate comprises at least a first waveguide comprising a portion in the first lateral area and a second waveguide comprising a portion in the second lateral area, the two waveguides being mutually coupled by a junction region comprising a central junction region that is located in the central area, a first intermediate junction region and a second intermediate junction region extending, respectively, into the first and second intermediate areas while gradually widening in order to meet the central junction region so as to form a bulge.

Thus, the bulge advantageously allows the optical signals to pass from one waveguide to the other while maintaining the waves in their fundamental mode by virtue of a gradual transition in guide width, and while reducing losses and the effects of parasitic reflections. The method for producing such a junction region is also advantageous, as will be described below.

At least the first waveguide comprises a first part produced on a second part that is wider than the first part thereof. Stated otherwise, the first waveguide may be a rib waveguide.

The junction region comprises a portion of said second part that extends from the first lateral area into the first intermediate area and into a part of the central area while gradually narrowing until reaching the width of the central junction region.

Thus, in the central region, the optical signal that remains in the middle of the guide is no longer affected by the interfaces delimiting the edges of the guide. Consequently, if the change in the form of the guide takes place in this region, no reflection or signal loss will occur.

According to one embodiment of this aspect, the second waveguide may also comprise a first part produced on a second part that is wider than the first part thereof and the junction region additionally comprises a portion of said second part that extends from the second lateral area into the second intermediate area and into a part of the central area while gradually narrowing until reaching the width of the central junction region.

Stated otherwise, the first and the second waveguides are rib waveguides.

The lengths of the first intermediate area and of the second intermediate area may be different.

The total length of the junction region may advantageously be less than or equal to thirty-five micrometers.

According to another aspect, a method for producing a photonic integrated device comprising two waveguides that are connected to one another by a junction region is proposed, the method comprising two successive operations of etching a semiconductor substrate.

According to a general feature of this other aspect, the first etching operation comprises a partial etching of the substrate with the exception of a first area which is masked by a first mask, and the second etching operation comprises a complete etching of the substrate with the exception of the first area still masked by the first mask and a second area which is masked by a second mask, the first etching operation and the second etching operation defining a bulge in the substrate.

The first mask may, for example, conventionally be a hard mask of silicon oxide, silicon nitride, amorphous carbon or titanium nitride, and the second mask may conventionally be a resist mask.

According to one mode of implementation, the substrate comprises a first lateral area, a second lateral area, a central area, a first intermediate area that is located between the first lateral area and the central area and a second intermediate area that is located between the second lateral area and the central area, and the first mask comprises a first portion located in the first lateral area, a second portion located in the second lateral area, a central mask region located in the central area, a first intermediate mask region and a second intermediate mask region extending, respectively, into the first and second intermediate areas while gradually widening in order to meet the central mask region, and the second mask comprises a rectangular mask region of constant width and a second intermediate mask region extending into the first intermediate area and into a part of the central area of the substrate while narrowing.

Thus, the second mask has a narrow end located over the bulge of the first mask, thereby advantageously providing a wider margin of error in the event of poor alignment of the two masks.

Preferably, the second mask is placed so as to leave a margin of greater than thirty-five nanometers between the end of the intermediate mask region and the edges of the central region of the first mask.

Thus, the first mask, or hard mask, confers self-alignment properties on the device since it remains in place during the second etching operation while protecting the first parts, or ribs, of the two waveguides and the central region.

According to one mode of implementation, the second etching operation comprises a complete etching of the substrate with the additional exception of a third area which is masked by a third mask, the third masked area being analogous to the second masked area and positioned as a mirror image with respect to the latter.

BRIEF DESCRIPTION OF THE DRAWINGS

Other advantages and features of the invention will become apparent on examining the detailed description of wholly non-limiting modes of implementation and embodiments and the appended drawings in which.

DETAILED DESCRIPTION

Figure 1:
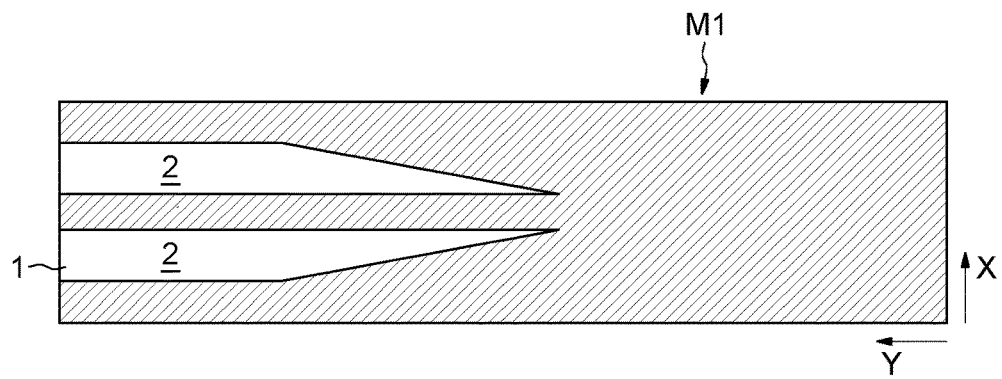
FIGS. 1 and 2, described above, illustrate the prior art.
Figure 2:
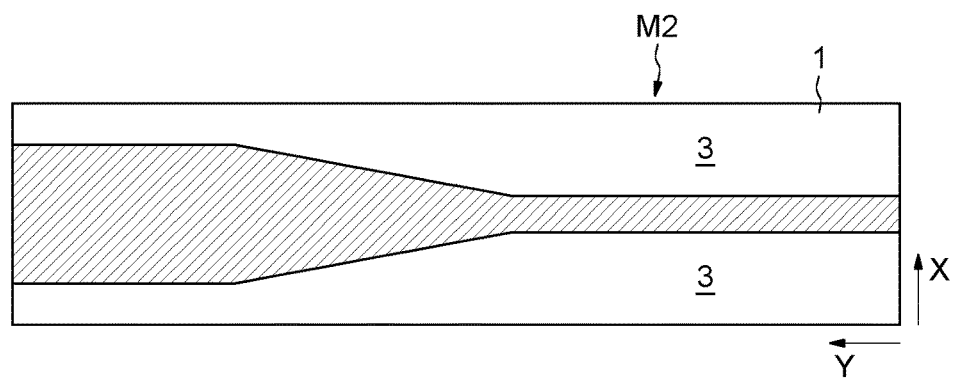
Figure 3:
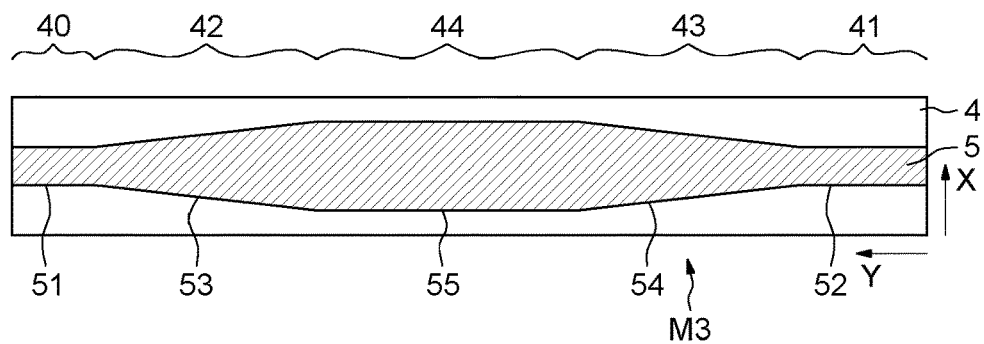
FIGS. 3 and 4 illustrate an etching method.
Figure 4:
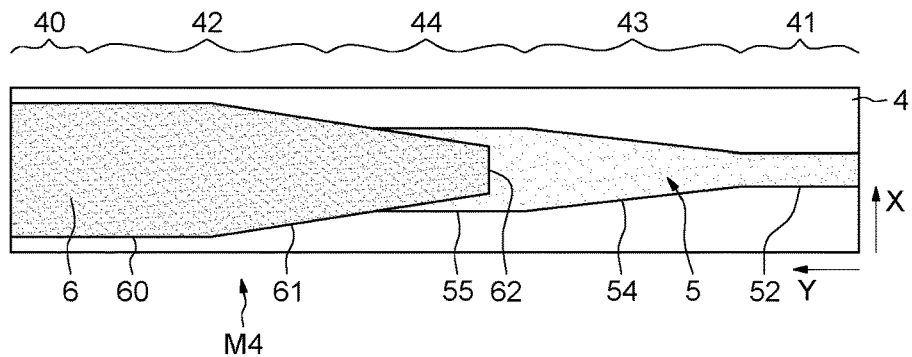

FIGS. 3 and 4 illustrate an etching method according to one mode of implementation. The etching method allows a junction region JCN to be formed between two waveguides G1 and G2 that are produced in a semiconductor substrate 4, in this instance a silicon film. In this instance, for example, the first waveguide G1 is a rib waveguide, and the second waveguide G2 is a strip waveguide.

The silicon film 4 may conventionally be produced on a buried insulating layer, itself produced on a carrier substrate. Stated otherwise, a silicon-on-insulator (SOI) technology is then employed. The thickness of the silicon film 4 is, in this instance, for example, three hundred nanometers.

The etching operation comprises the production of a first mask M3, for example a hard mask of silicon nitride, and a second mask M4, for example a resist mask, which conventionally allow certain regions of the material to be retained during etching.

Initially, the silicon film is surmounted by a layer of nitride, itself surmounted by a layer of resist. These two layers allow the first mask M3 to be produced.

In a first step (FIG. 3), the first mask M3 is produced on top of the silicon film 4.

The first mask M3 is produced via a conventional method of etching the layers of resist then the layer of nitride, so as to cover a first masked region 5 of the silicon film 4. At the end of the process of producing the first mask M3, the entire layer of resist has been etched or removed, and only an unetched part of the nitride layer remains, in this instance forming the first mask M3, or hard mask.

The first mask M3 comprises two mask parts 51 and 52, in this instance rectangular, of three hundred and fifty and four hundred nanometers in width (measured along the transverse direction X), respectively, and each located, respectively, on a first lateral area 40 and on a second lateral area 41 of the silicon film 4.

The lateral areas extend along a first direction Y, for example a longitudinal direction, orthogonal to the second direction X, for example the transverse direction.

The two rectangular mask parts 51 and 52 extend, respectively, into a first intermediate area 42 and onto a second intermediate area 43 of the silicon film while forming two intermediate mask regions 53 and 54 that gradually widen in the direction of a central area 44 of the silicon film 4 until meeting in the central area 44 while forming a central mask region 55 of one thousand two hundred nanometers in width.

In this instance for example, the intermediate mask regions 53 and 54 each have a length of one hundred micrometers.

Subsequently, with the aid of this first, nitride mask M3, the silicon film 4 is partially etched. The etching operation is carried out according to a conventional method known per se. The etching operation is carried out so as to etch the part of the silicon film 4 in the regions not covered by the nitride mask M3. In this instance, the silicon is partially etched to a depth of one hundred and fifty nanometers.

In a second step (FIG. 4), a second mask M4 is placed on top of the previously etched silicon film 4, on the first mask M3, so as to cover a second region 6 of the semiconductor film 4.

To this end, a new layer of resist is deposited so as to completely cover the silicon film and the first, nitride mask M3.

Then, the second mask M4 is produced via a conventional method of etching the new layer of resist, so that the unetched part of the new layer of resist forms the second, resist mask M4 and covers a second masked area 6 of the multilayer of the silicon film 4 and of the first, nitride mask M3.

The second, resist mask M4 comprises a rectangular mask region 60 that extends into the lateral area 40 and over a part of the first intermediate area 42 of the silicon film 4 and whose width, in this instance, is four micrometers.

The rectangular region 60 extends into the first intermediate area 42 and over a part of the central area 44 of the silicon film while forming a second intermediate mask region 61 that gradually narrows until reaching, for example, a width of six hundred nanometers at its end 62.

The end 62 of the second mask M4 is much narrower than the central region 55 previously formed by the first mask M3 and still protected by the first, nitride mask M3, or hard mask, a margin of three hundred nanometers being present between the borders of the central mask region 55 and the end 62 of the second mask M4.

Thus, an alignment error between the two masks, for example an alignment error of several tens of nanometers along the axis X, will not lead to the formation of a discontinuity, or wall, in the silicon.

The silicon film is subsequently completely etched, so that the regions not protected by the first, nitride mask M3 and the regions not protected by the second, resist mask M4 are fully etched.

Then, the first, nitride mask M3 and the second, resist mask M4 are removed via conventional methods.

A device such as that illustrated in FIG. 5 and described below is thus obtained.

Figure 5:
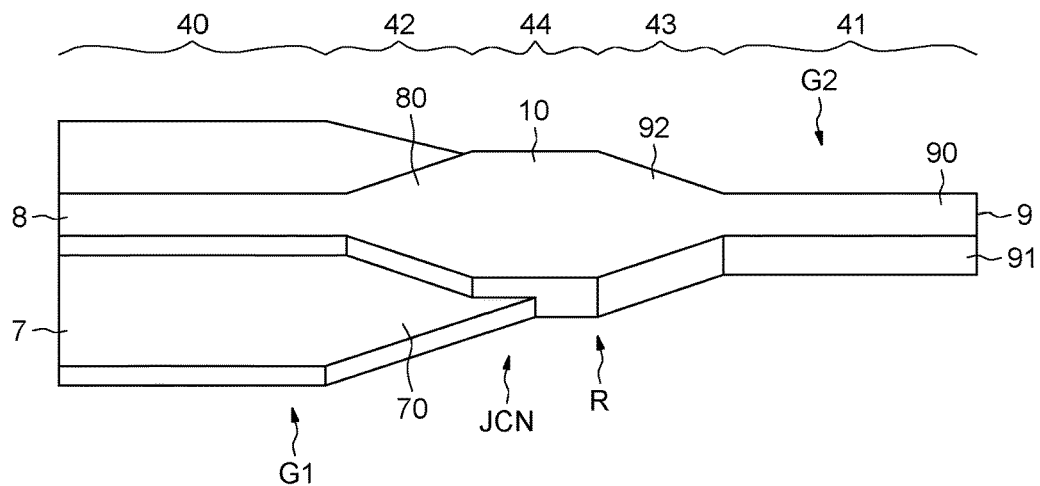
FIG. 5 illustrates a photonic integrated device.

FIG. 5 illustrates a first embodiment of a photonic integrated device comprising two waveguides G1 and G2 that are connected by a junction region JCN.

The first waveguide G1 extends into a first lateral area 40 of the silicon film and comprises a first, bottom part, or slab 7, whose thickness is one hundred and fifty nanometers and whose width is four micrometers, and on which a second, top part, or rib 8, whose width is three hundred and sixty nanometers, is located. According to the chosen wavelength and the dimensions of the target circuit, this width may vary from 300 to 450 nanometers.

The second waveguide G2 extends into a second lateral area 41 of the silicon film and comprises a top part 90 and a bottom part 91 of identical widths. It is therefore conventionally considered that the second waveguide G2 comprises a single strip 9 of four hundred nanometers width. According to the chosen wavelength and the dimensions of the target circuit, this width may vary from 300 to 500 nanometers.

The junction region JCN comprises a first and a second intermediate junction region 80 and 92 that comprise, respectively, a portion of the rib 8 of the first waveguide G1 and a portion of the strip 9 of the second waveguide G2 which extend, respectively, into the intermediate areas 42 and 43 of the silicon film while gradually widening up to the central area 44 of the silicon film where they meet while forming a rectangular central junction region 10 of ten micrometers in length and one thousand two hundred nanometers in width. This width is conventional, and could be greater than 1300 nanometers. The maximum width of the central junction region 10 depends on the compactness of the component.

The junction region JCN also comprises a portion of the bottom part 7 of the first waveguide G1 that extends into the intermediate area 42 of the silicon film and into the central area while decreasing in width until reaching the width of the central junction region 10.

Thus, the junction region JCN between the two waveguides G1 and G2 comprises a bulge R. This bulge is in particular the result of the more robust production method described above, allowing the discontinuities due to a potential misalignment between the two masks M3 and M4 to be substantially limited.

Additionally, even if the method generates discontinuities on the edges of the junction region JCN, the bulge R is wide enough for a light signal flowing therethrough to be sufficiently far away from the edges and therefore advantageously not to be affected by these discontinuities.

The gradual variations in the widths in the intermediate areas 42 and 43 of the silicon film also allow the light wave to be maintained in its fundamental mode while passing through the junction JCN.

It should be noted that the embodiments presented here are completely non-limiting. In particular, although a junction region JCN between two waveguides of different types has been described, it would be entirely conceivable to produce a junction region between two waveguides of the same type but having different characteristics.

Figure 6:
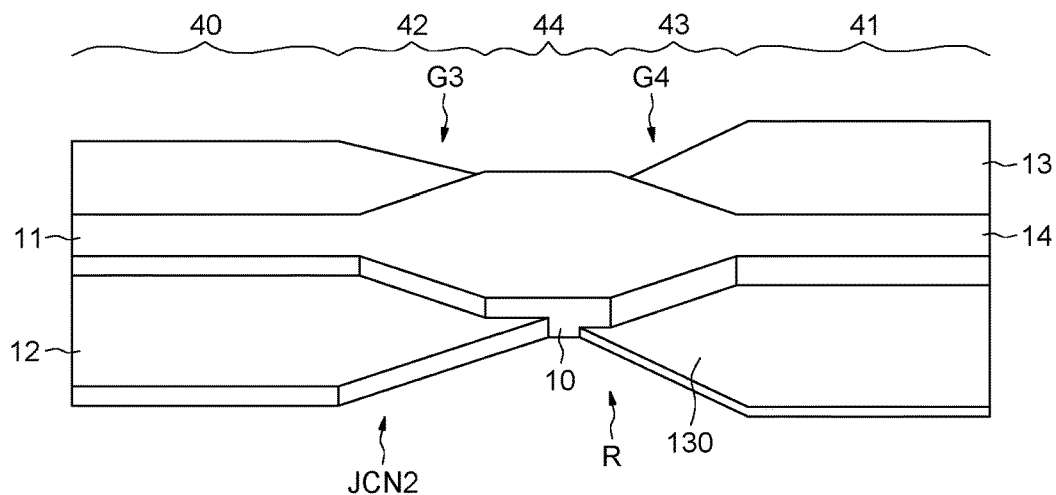
FIG. 6 illustrates a photonic device.

Thus, FIG. 6 illustrates an embodiment of a photonic device that comprises two rib waveguides G3 and G4 which are connected by a junction region JCN2.

The first rib waveguide G3 comprises a top part 11, of one hundred and fifty nanometers in thickness and of three hundred and twenty nanometers in width, produced on a bottom part 12, of one hundred and fifty nanometers in thickness.

The second rib waveguide G4 comprises a bottom part 13 of fifty nanometers in thickness, and a top part 14 of two hundred and fifty nanometers in thickness and of four hundred nanometers in width.

It would also be conceivable to have a junction between two strip waveguides of different dimensions.

Figure 7:
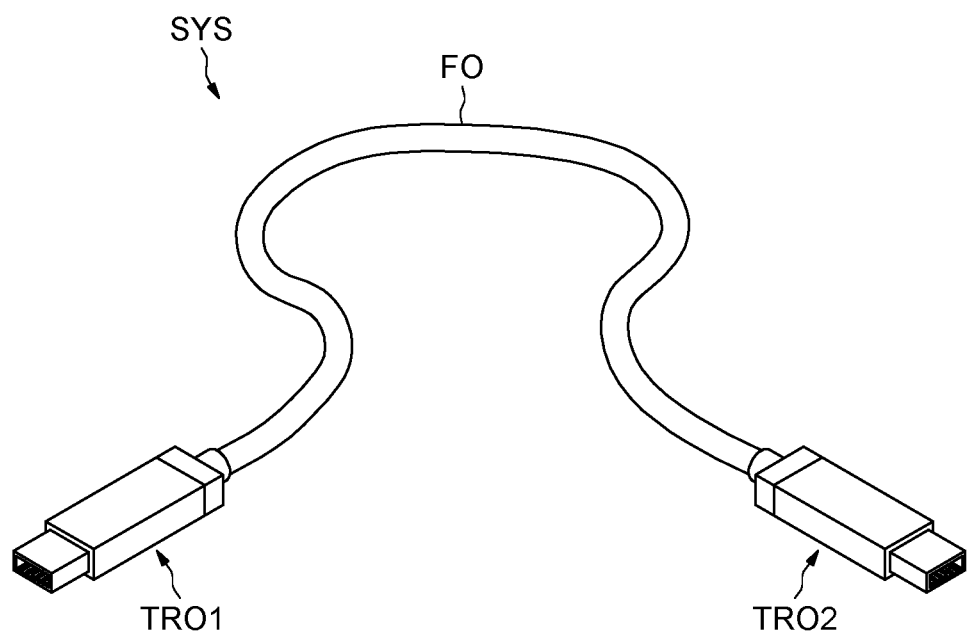
FIG. 7 illustrates a system.

FIG. 7 illustrates a system comprising a device according to one embodiment of the invention. The system SYS is, in this instance, an active optical fiber, conventionally comprising two optical transceivers TRO1 and TRO2 comprising devices such as those described above and illustrated in FIGS. 3 to 6, coupled to an optical fiber FO.

This system is conventionally intended for the connection of two items of computer equipment, for example computers, routers or switches, while improving communication performance.

Although junctions extending over a length of about two hundred and ten micrometers have been presented here, it would be entirely possible and advantageous to produce a smaller junction region, extending, by way of non-limiting example, over a length of less than thirty-five micrometers, where, for example, a first intermediate area of the silicon film measures about ten micrometers, a second intermediate area of the silicon film measures twenty micrometers, and a central area of the silicon film measures about 1 micrometer.

Additionally, although a bulge R of octagonal form has been presented here, it would be entirely conceivable to produce a bulge R comprising no edges, i.e. taking a rounded form for example. The central junction region 10 would then not be of constant width.

The invention claimed is:

1. A method for producing a photonic integrated device comprising a first waveguide and a second waveguide that are connected to one another by a junction region, the method comprising:
    masking a first area of a semiconductor film on an insulator with a first mask;
    performing a first etching operation on the semiconductor film wherein said first etching operation comprises etching partially through a thickness of the semiconductor film with the exception of a first area of the semiconductor film which is masked by the first mask;
    masking a second area of the semiconductor film with a second mask, said second mask covering a portion of the first mask and covering a reduced thickness portion of the semiconductor film; and
    performing a second etching operation on the semiconductor film wherein said second etching operation comprises etching completely through the semiconductor film to the insulator with the exception of the first area and the second area which are masked by the first and second masks;
    wherein the first area defines a rib of the first waveguide, the junction region and a strip of the second waveguide, and wherein the second area defines a slab of the first waveguide having the reduced thickness.

2. The method of claim 1, wherein the second mask covering the second area of the semiconductor film extends on opposite sides of the portion of the first mask so that the slab of the first waveguide having the first reduced thickness extends on opposite sides of the rib of the first waveguide.

3. A method for producing a photonic integrated device comprising a first waveguide and a second waveguide that are connected to one another by a junction region, the method comprising:
    masking a first area of a semiconductor film on an insulator with a first mask;

performing a first etching operation on the semiconductor film wherein said first etching operation comprises etching partially through a thickness of the semiconductor film with the exception of a first area of the semiconductor film which is masked by a first mask;

masking a second area of the semiconductor film with a second mask, said second mask covering a first portion of the first mask and covering a first reduced thickness portion of the semiconductor film;

performing a second etching operation on the semiconductor film wherein said second etching operation comprises etching partially through the semiconductor film with the exception of the first area and the second area which are masked by the first and second masks;

masking a third area of the semiconductor film with a third mask, said third mask covering a second portion of the first mask and covering a second reduced thickness portion of the semiconductor film;

performing a third etching operation on the semiconductor film wherein said third etching operation comprises etching completely through the semiconductor film to the insulator with the exception of the first area, the second area and the third area which are masked by the first, second and third masks;

wherein the first area defines a rib of the first waveguide, the junction region and a rib of the second waveguide, wherein the second area defines a slab of the first waveguide having the first reduced thickness, and wherein the third area defines a slab of the second waveguide having the second reduced thickness.

4. The method of claim 3, wherein the second mask covering the second area of the semiconductor film extends on opposite sides of the portion of the first mask so that the slab of the first waveguide having the first reduced thickness extends on opposite sides of the rib of the first waveguide.

5. The method of claim 3, wherein the third mask covering the third area of the semiconductor film extends on opposite sides of the portion of the first mask so that the slab of the second waveguide having the second reduced thickness extends on opposite sides of the rib of the second waveguide.

6. A method for producing a photonic integrated device from a semiconductor film on an insulator, wherein said semiconductor film comprises a first lateral area, a second lateral area, a central area, a first intermediate area that is located between the first lateral area and the central area and a second intermediate area that is located between the second lateral area and the central area, the method comprising:

applying a first mask over the semiconductor film, wherein said first mask comprises a first portion located over the first lateral area, a second portion located over the second lateral area, a central portion of constant width located over the central area, a first intermediate portion located over the first intermediate area and a second intermediate portion located over the second intermediate area, wherein a width of the first and second intermediate portions gradually widens in order to meet the constant width of the central portion;

performing a first etching operation on the semiconductor film wherein said first etching operation comprises etching partially through a thickness of the semiconductor film with the exception of areas which are masked by the first mask;

applying a second mask over the semiconductor film, wherein said second mask comprises a rectangular portion of constant width over the first lateral area and a third intermediate portion having a narrowing width over the first intermediate area and at least a part of the central area; and performing a second etching operation on the semiconductor film wherein said second etching operation comprises etching completely through the semiconductor film to the insulator with the exception of areas which are masked by the first and second masks;

wherein the first portion of the first mask defines a rib of the first waveguide, the first intermediate portion, central portion and second intermediate portion define a junction region, the second portion of the first mask defines a strip of the second waveguide, and wherein the rectangular portion and third intermediate portion of the second mask defines a slab of the first waveguide having a reduced thickness.

7. The method according to claim 6, further comprising positioning the second mask so as to leave a margin of greater than thirty-five nanometers between an end of the third intermediate portion and edges of the central portion of the first mask which define the constant width.

* * * * *